United States Patent
Martin Grant

(10) Patent No.: US 9,365,172 B2
(45) Date of Patent: Jun. 14, 2016

(54) WIRELESS ACTIVATOR FOR VEHICLE AND VEHICLE USING SAME

(71) Applicant: HON HAI PRECISION INDUSTRY CO., LTD., New Taipei (TW)

(72) Inventor: Matthew Martin Grant, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/591,109

(22) Filed: Jan. 7, 2015

(65) Prior Publication Data

US 2015/0191137 A1    Jul. 9, 2015

(30) Foreign Application Priority Data

Jan. 9, 2014   (TW) .............................. 103100739 A

(51) Int. Cl.
| | |
|---|---|
| *B60R 16/027* | (2006.01) |
| *E05F 15/60* | (2015.01) |
| *B60J 5/04* | (2006.01) |
| *G08C 17/04* | (2006.01) |
| *H04B 5/00* | (2006.01) |

(52) U.S. Cl.
CPC ................. *B60R 16/027* (2013.01); *B60J 5/04* (2013.01); *E05F 15/60* (2015.01); *G08C 17/04* (2013.01); *H04B 5/0031* (2013.01); *H04B 5/0037* (2013.01); *H04B 5/0087* (2013.01)

(58) Field of Classification Search
CPC ........ G08C 17/02; G08C 23/04; G08C 17/00; G08C 2201/20; G08C 2201/30; G08C 2201/32; G08C 2201/50; G08C 2201/92
USPC ....................................................... 340/12.22
See application file for complete search history.

(56) References Cited

U.S. PATENT DOCUMENTS

| | | | | |
|---|---|---|---|---|
| 5,680,134 | A * | 10/1997 | Tsui .................... | G07C 9/00182 340/12.22 |
| 6,046,510 | A | 4/2000 | Kawanobe et al. | |
| 6,292,107 | B1 * | 9/2001 | Yamaura ............... | B60R 25/104 340/12.22 |
| 6,664,899 | B1 * | 12/2003 | Tsuchihashi .......... | B60R 25/245 180/287 |
| 2004/0227374 | A1 | 11/2004 | Hirota et al. | |
| 2009/0179769 | A1 * | 7/2009 | Horler .................... | G08C 17/04 340/870.01 |
| 2012/0206097 | A1 | 8/2012 | Soar | |
| 2014/0167936 | A1 * | 6/2014 | Lee ........................ | G08C 17/02 340/12.54 |

* cited by examiner

*Primary Examiner* — Mark Blouin
(74) *Attorney, Agent, or Firm* — Novak Druce Connolly Bove + Quigg LLP

(57) ABSTRACT

A wireless activator is used for a vehicle. The wireless activator includes a transmitting control module, a transmitting module, a receiving module, and a receiving control module. The transmitting control module is positioned in a main portion of the vehicle. The transmitting module is positioned in the main portion and electrically coupled to the transmitting control module. The receiving module is positioned in a movable portion of the vehicle. The receiving control module is positioned in the movable portion and electrically coupled to the receiving module. The wireless activator is used for wirelessly supplying electrical power to the movable portion, and controlling the movable portion move relative to the main portion. A vehicle using the wireless activator is also provided.

20 Claims, 2 Drawing Sheets

WIRELESS ACTIVATOR FOR VEHICLE AND VEHICLE USING SAME

FIELD

The subject matter herein generally relates to wireless activators, and particularly to a wireless activator for vehicle and a vehicle using the wireless activator.

BACKGROUND

Movable portions of a vehicle, such as a vehicle door, can move relative to a main portion of the vehicle. Electric wires usually route from the main portion and into the movable portions for supplying electric power to open or close the movable portions. However, the electric wires are easily worn.

BRIEF DESCRIPTION OF THE DRAWINGS

Implementations of the present technology will now be described, by way of example only, with reference to the attached figures.

DETAILED DESCRIPTION

Figure 1:
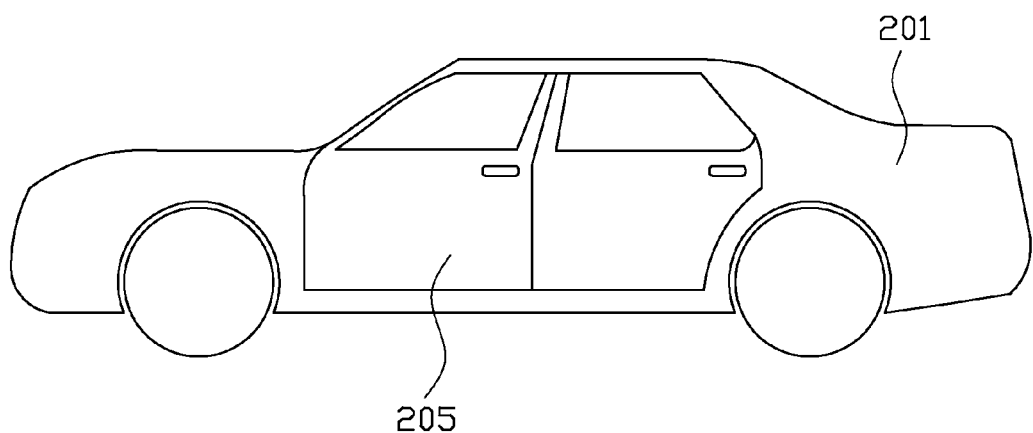
FIG. 1 illustrates a diagrammatic view of a vehicle having a wireless activator.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is in relation to a wireless activator for a vehicle. A wireless activator can include a transmitting control module, a transmitting module, a receiving module, and a receiving control module. The transmitting control module can be positioned in a main portion of the vehicle. The transmitting module can be positioned in the main portion of the vehicle and electrically coupled to the control module. The transmitting module can have a transmitting coil and a transmitting communication coil. The receiving module can be positioned in the movable vehicle portion and having a receiving coil and a receiving communication coil. The receiving control module can be electrically coupled to the receiving module and positioned in the movable vehicle portion. The transmitting control module can be configured to generate a magnetic field in the transmitting coil causing the receiving coil to generate an inductive magnetic field and charging the receiving control module. When a move signal is initiated, the transmitting control module is configured to drive the transmitting communication coil to generate a magnetic field inducing the receiving communication coil to generate a magnetic field and transmit a move signal to the receiving control module to activate movement of the moving vehicle portion. The present disclosure also supplies a vehicle using the wireless activator.

Figure 2:
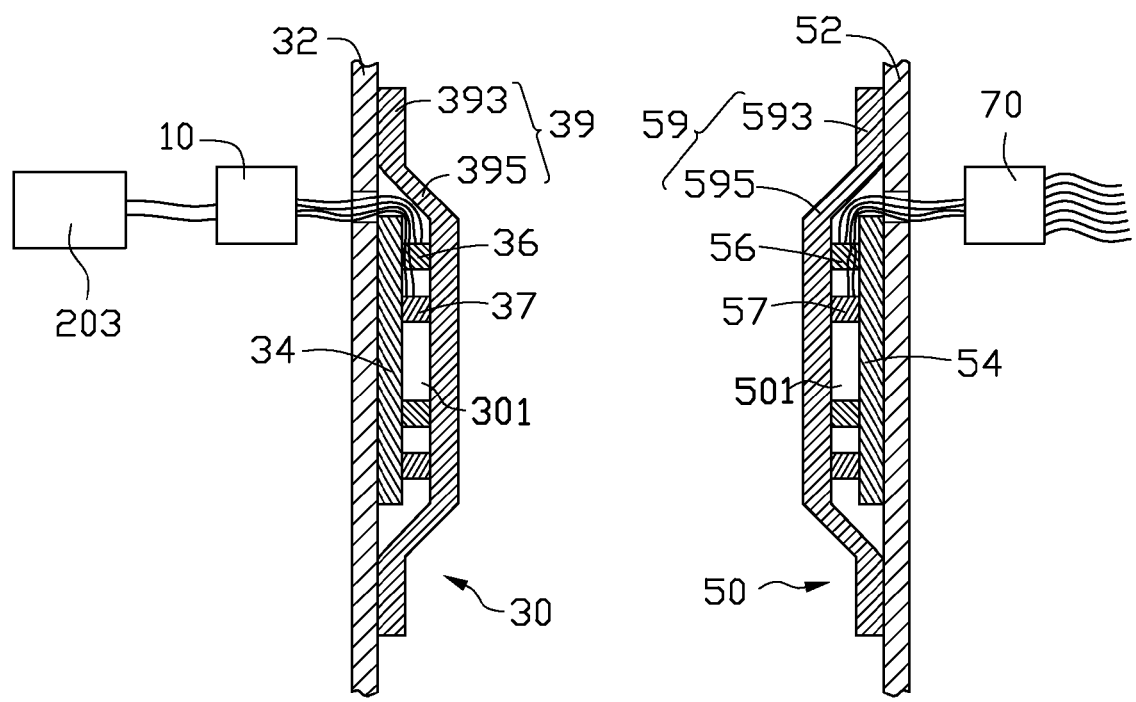
FIG. 2 is a diagrammatic view of the wireless activator of the vehicle of FIG. 1.

FIG. 1 illustrates a vehicle 200. Also referring to FIG. 2, the vehicle 200 can include a main portion 201, a control system 203 positioned in the main portion 201, a movable portion 205 movably coupled to the main portion 201, and a wireless activator 100. The wireless activator 100 can be positioned in the main portion 201 and the movable portion 205. The wireless activator 100 can be used for wirelessly supplying electrical power to the movable portion 205, and controlling the movable portion 205 move relative to the main portion 201. In the illustrated embodiment, the movable portion 205 is a door of the vehicle 200.

Referring to FIG. 2 again, the wireless activator 100 can include a transmitting control module 10, a transmitting module 30, a receiving module 50, and a receiving control module 70. The transmitting control module 10 and the transmitting module 30 can be positioned in the main portion 201 and electrically coupled to each other. The receiving module 50 and the receiving control module 70 can be positioned in the movable portion 205 and electrically coupled to each other. The vehicle 200 can also further include other functional modules and structures, such as an opening mechanism (not shown) positioned in the main portion 201 for opening or closing the movable portion 205, but not described here for simplify. The transmitting module 30 can generate magnetic fields, and the receiving module 50 can generate inductive magnetic fields when inducting the magnet fields generated by the transmitting module 30.

The transmitting control module 10 can be electrically coupled to the control system 203 via electrical wires for vehicle. The transmitting control module 10 can be used for receiving and decoding signals from the control system 203, and sending decoded signals to the transmitting module 30 for driving the transmitting module 30. The transmitting control module 10 can be electrically coupled to an alternating current power source (not shown) of the vehicle 200. In other embodiments, the transmitting control module 10 can be electrically coupled to a direct current source; and the transmitting control module 10 can convert direct current to be alternating current.

The transmitting module 30 can be positioned in the main portion 201 and electrically coupled to the transmitting control module 10. The transmitting module 30 can include a first fixing member 32, a first shielding member 34, a first communication coil 36, a transmitting coil 37, and a first housing 39. The first fixing member 32 can be substantially a panel. The first fixing member 32 can be positioned in the main portion 201. The first shielding member 34 can be positioned on the first fixing member 32 for shielding outer interference signal to the transmitting module 30. The first shielding member 34 can be made of metal. The first communication coil 36 can be positioned on a side of the first shielding member 34 away from the first fixing member 32. The first communication coil 36 can be used for receiving a signal from the control system 203 and sending the signal to the receiving module 50. The transmitting coil 37 can be positioned on the side of the first shielding member 34 away from the first fixing member 32. The transmitting coil 37 can be received in the first communication coil 36, and the transmitting coil 37 and the first communication coil 36 can be homocentric. The transmitting coil 37 can be spaced from the first communication coil 36 with a certain distance.

The first housing 39 can be fixedly coupled to the first fixing member 32. The first shielding member 34, the transmitting coil 37, and the first communication coil 36 can be received in a first receiving space 301 cooperatively defined by the first fixing member 32 and the first housing 39. The first housing 39 can create a dustproof environment for the first shielding member 34, the first communication coil 36, the transmitting coil 37. The first housing 39 can include two mounting portions 393 and a connection portion 395 coupled between the two mounting portions 393. The two mounting portions 393 can be coupled with the first fixing member 32. The connection portion 395 can protrude from the two mounting portions 393. The first housing 39 can be made of insulation material.

The receiving module 50 can be positioned in the movable portion 205 and electrically coupled to the receiving control module 70. The receiving module 50 can include a second fixing member 52, a second shielding member 54, a second communication coil 56, a receiving coil 57, and a second housing 59. The second fixing member 52 can be substantially a panel. The second fixing member 52 can be positioned in the movable portion 205. The second shielding member 54 can be positioned on the second fixing member 52 for shielding outer interference signals to the receiving module 50. The second shielding member 54 can be made of metal. The second communication coil 56 can be positioned on a side of the second shielding member 54 away from the second fixing member 52 and electrically coupled to the receiving control module 70. The receiving coil 57 can be positioned on the side of the second shielding member 54 away from the second fixing member 52. The receiving coil 57 can be received in the second communication coil 56, and the receiving coil 57 and the second communication coil 56 can be homocentric. The receiving coil 57 can be spaced from the second communication coil 56 with a certain distance.

The second housing 59 can be fixedly coupled to the second fixing member 52. The second shielding member 54, the receiving coil 57, and the second communication coil 56 can be received in a second receiving space 501 cooperatively defined by the second fixing member 52 and the second housing 59. The second housing 59 can create a dustproof environment for the second shielding member 54, the second communication coil 56, the receiving coil 57. The second housing 59 can include two mounting portions 593 and a connection portion 595 coupled between the two mounting portions 593. The two mounting portions 593 can be coupled with the second fixing member 52. The connection portion 595 can protrude from the two mounting portions 593. The second housing 59 can be made of insulation material.

The transmitting coil 37, the first communication coil 36, the receiving coil 57, and the second communication coil 56 can be made of metal coils. Materials, diameters, numbers of the transmitting coil 37 and the receiving coil 57 can be matching each other. Thus, the receiving coil 57 can generate an inductive magnetic field when inducting the magnet field generated by the transmitting coil 37. Materials, diameters, numbers of the first communication coil 36, and the second communication coil 56 can be matching each other. Thus, the second communication coil 56 can generate an inductive magnetic field when inducting the magnet field generated by the first communication coil 36. In the illustrated embodiment, diameters of the transmitting coil 37 and the receiving coil 57 are the same; and diameters of the first communication coil 36 and the second communication coil 56 are the same. The transmitting coil 37, the first communication coil 36, the receiving coil 57, and the second communication coil 56 can be made of copper wire. In other embodiments, the transmitting coil 37, the first communication coil 36, the receiving coil 57, and the second communication coil 56 can be formed on one base board (nor shown) via an electroplating method. The materials, heights, shapes of the first communication coil 36, and the second communication coil 56 can match each other, and the materials, heights, shapes of the transmitting coil 37, and the receiving coil 57 can be matching each other.

The receiving control module 70 can be positioned in the movable portion 205 and electrically coupled to the receiving coil 57 and a second communication coil 56. The receiving control module 70 can be used for transforming signals from the receiving coil 57 and the second communication coil 56 to be electrical signals.

In use, the transmitting control module 10 will receive a charging signal from the control system 203 when a user initiates the control system 203 to generate the charging signal to charge the receiving control module 70. The transmitting control module 10 can drive the transmitting coil 37 to generate a first magnet field. The receiving coil 57 can generate an inductive second magnetic field when inducting the first magnet field generated by the transmitting coil 37. The receiving control module 70 can receive signals from the receiving coil 57 and transform the signals to be electrical signals, and then the receiving control module 70 can be wireless charged for supplying electrical power. A move signal for opening or closing the movable portion 205 can be transmitted to the transmitting control module 10 from the control system 203 when the user initiates the control system 203 to generate the move signal. The transmitting control module 10 can drive the first communication coil 36 generate a third magnet field according to the move signal. The second communication coil 56 can induct a fourth inductive magnetic field when inducting the fourth magnet field generated by the first communication coil 36, and then transmit a control move signal to the receiving control module 70. The receiving control module 70 can transform the move control signal to be a control electrical signal and drive the movable portion 205 to move relative to the main portion 201.

The transmitting control module 10 and the transmitting module 30 can be positioned in the main portion 201. The receiving module 50 and the receiving control module 70 positioned in the movable portion 205. The wireless activator 100 can wirelessly supply power to the movable portion 205 and wirelessly communicate with the movable portion 205.

In other embodiments, the movable portion 205 can be not limited to be the door of the vehicle 200, and it can be other movable structures of the vehicle 200, such as a trunk lid.

In other embodiments, a button (not shown) electrically coupled to the receiving control module 70 can be positioned in the movable portion 205 or in main portion 201, the movable portion 205 can be opened or closed relative to the main portion 201 when the button is pressed. A signal emission module (not shown) can be positioned in a car key (not shown), and a signal receiving module (not shown) corresponding to the signal emission module can set in the control module. The movable portion 205 can be opened or closed relative to the main portion 201 when the signal receiving module of the car key is triggered.

In other embodiments, the first fixing member 32, the first shielding member 34, the first housing 39 can be omitted, then the first communication coil 36 and the transmitting coil 37 can be positioned in one structure of the main portion 201. The second fixing member 52, the second shielding member 54, the second housing 59 can be omitted, then the second communication coil 56 and the receiving coil 57 can be positioned in one structure of the movable portion 205.

The embodiments shown and described above are only examples. Many details are often found in the art such as the other features of a wireless activator for vehicle and vehicle using the same. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A wireless activator for a movable portion of a vehicle, the wireless activator comprising:
   a transmitting control module positioned in a main portion of the vehicle;
   a transmitting module positioned in the main portion of the vehicle and electrically coupled to the transmitting control module, and having a transmitting coil and a transmitting communication coil;
   a receiving module positioned in the movable vehicle portion and having a receiving coil and a receiving communication coil; and
   a receiving control module electrically coupled to the receiving module and positioned in the movable vehicle portion;
   wherein, the transmitting control module is configured to generate a magnetic field in the transmitting coil causing the receiving coil to generate an inductive magnetic field and charging the receiving control module; and
      wherein, when a move signal is initiated, the transmitting control module is configured to drive the transmitting communication coil to generate a magnetic field inducing the receiving communication coil to generate a magnetic field and transmit a move signal to the receiving control module to activate movement of the moving vehicle portion.

2. The wireless activator of claim 1, wherein the transmitting coil is received in the first communication coil, and the transmitting coil and the first communication coil are homocentric.

3. The wireless activator of claim 1, wherein the transmitting module further comprises a first fixing member positioned in the main portion, the transmitting coil and the first communication coil are positioned on the first fixing member.

4. The wireless activator of claim 3, wherein the transmitting module further comprises a first shielding member fixed on the first fixing member, the transmitting coil and the first communication coil are positioned on the first fixing member via the first shielding member.

5. The wireless activator of claim 4, wherein the transmitting module further comprises a first housing fixedly coupled to the first fixing member, the first shielding member, the transmitting coil, and the first communication coil are received in the first housing.

6. The wireless activator of claim 5, wherein the first housing comprises two mounting portions and a connection portion coupled between the two mounting portions, the two mounting portions are coupled with the first fixing member, the connection portion and the first fixing member cooperatively form a first receiving space, and the first shielding member, the transmitting coil, and the first communication coil are received in the first receiving space.

7. The wireless activator of claim 1, wherein the receiving coil is received in the second communication coil, the receiving coil and the second communication coil are homocentric.

8. The wireless activator of claim 1, wherein the receiving module further comprises a second fixing member positioned in the movable portion, the receiving coil and the second communication coil are positioned on the second fixing member.

9. The wireless activator of claim 8, wherein the receiving module further comprises a second shielding member fixed on the second fixing member, the receiving coil and the second communication coil are positioned on the second fixing member via the second shielding member.

10. The wireless activator of claim 9, wherein the receiving module further comprises a second housing fixedly coupled to the second fixing member, the second shielding member, the receiving coil, and the second communication coil are received in the second housing.

11. The wireless activator of claim 10, wherein the second housing comprises two mounting portions and a connection portion coupled between the two mounting portions, the mounting portions are coupled with the second fixing member, the connection portion and the second fixing member cooperatively form a second receiving space, and the second shielding member, the receiving coil, and the second communication coil are received in the second receiving space.

12. A vehicle, comprising:
   a main portion;
   a transmitting control module positioned in the main portion;
   a movable portion movably coupled to the main portion, and
   a wireless activator, comprising:
   a transmitting control module positioned in a main portion of the vehicle;
   a transmitting module positioned in the main portion of the vehicle and electrically coupled to the transmitting control module, and having a transmitting coil and a transmitting communication coil;
   a receiving module positioned in the movable vehicle portion and having a receiving coil and a receiving communication coil; and
   a receiving control module electrically coupled to the receiving module and positioned in the movable vehicle portion;
   wherein, the transmitting control module is configured to generate a magnetic field in the transmitting coil causing the receiving coil to generate an inductive magnetic field and charging the receiving control module; and
      wherein, when a move signal is initiated, the transmitting control module is configured to drive the transmitting communication coil to generate a magnetic field inducing the receiving communication coil to generate a magnetic field and transmit a move signal to the receiving control module to activate movement of the moving vehicle portion.

13. The vehicle of claim 12, wherein the transmitting coil is received in the first communication coil, and the transmitting coil and the first communication coil are homocentric.

14. The vehicle of claim 12, wherein the transmitting module further comprises a first fixing member positioned in the main portion, the transmitting coil and the first communication coil are positioned on the first fixing member.

15. The vehicle of claim 14, wherein the transmitting module further comprises a first shielding member fixed on the first fixing member, the transmitting coil and the first communication coil are positioned on the first fixing member via the first shielding member.

16. The vehicle of claim 15, wherein the transmitting module further comprises a first housing fixedly coupled to the first fixing member, the first shielding member, the transmitting coil, and the first communication coil are received in the first housing.

17. The vehicle of claim 16, wherein the first housing comprises two mounting portions and a connection portion coupled between the two mounting portions, the two mounting portions are coupled with the first fixing member, the connection portion and the first fixing member cooperatively form a first receiving space, and the first shielding member, the transmitting coil, and the first communication coil are received in the first receiving space.

18. The vehicle of claim 12, wherein the receiving coil is received in the second communication coil, the receiving coil and the second communication coil are homocentric.

19. The vehicle of claim 12, wherein the receiving module further comprises a second fixing member positioned in the movable portion, the receiving coil and the second communication coil are positioned on the second fixing member.

20. The vehicle of claim 19, wherein the receiving module further comprises a second shielding member fixed on the second fixing member, the receiving coil and the second communication coil are positioned on the second fixing member via the second shielding member.

\* \* \* \* \*